United States Patent [19]

Kanayama

[11] Patent Number: 4,470,085
[45] Date of Patent: Sep. 4, 1984

[54] CUE SIGNAL-RECORDING APPARATUS

[75] Inventor: Katsumi Kanayama, Tokyo, Japan

[73] Assignee: Olympus Optical Co., Ltd., Tokyo, Japan

[21] Appl. No.: 286,028

[22] Filed: Jul. 22, 1981

[30] Foreign Application Priority Data

Jul. 31, 1980 [JP] Japan ................ 55-105568

[51] Int. Cl.³ .................. G11B 15/00
[52] U.S. Cl. ................ 360/72.1; 360/72.2; 360/72.3; 369/47
[58] Field of Search ........ 360/55, 72.1, 72.2, 360/72.3, 27, 66, 68; 369/47, 50

[56] References Cited

U.S. PATENT DOCUMENTS 3,982,277 9/1976 Naylor ............... 360/27
4,190,869 2/1980 Ota .................. 360/73 X
4,338,639 7/1982 Fujibayashi ........ 360/72.2 X

OTHER PUBLICATIONS

Television Broadcasting, Tape & Disc Recording Systems, Ennes, 1975.

Primary Examiner—Robert L. Richardson
Attorney, Agent, or Firm—Frishauf, Holtz, Goodman & Woodward

[57] ABSTRACT

Disclosed is a cue signal-recording apparatus which includes a motor for driving a recording tape, a generator which is connected to the motor and produces a first signal whose frequency corresponds to the running speed of the tape, and a circuit which is connected to the generator and records a second signal synchronized with the first signal on the tape. The second signal is used as a cue signal for indicating the position of particular data recorded on the tape.

11 Claims, 12 Drawing Figures

CUE SIGNAL-RECORDING APPARATUS

BACKGROUND OF THE INVENTION

This invention relates to a cue signal-recording apparatus for recording a cue signal which is used, for example, in a dictation-recording tape recorder to detect the start point of particular recorded data.

A cue signal is often applied in a dictation-recording tape recorder. The cue signal is recorded on a tape immediately before the start point of dictated data, and then said dictated data is recorded on the tape. When typing an expression from the recorded dictation, a typist can quickly detect the start point of a particular recorded dictation which is to be typed by utilizing the cue signal.

A cue signal for detecting the start point of a particular recorded data is generally sent forth from an astable multivibrator. The frequency of such type of vibrator is liable to vary with changes with time and temperature in the impedance of the CR parts used and also with changes in the voltage of a power source. Now let it be assumed that a circuit for detecting a cue signal when a tape is set at a reproduction mode is of the type which carries out the frequency separation of the cue signal. In such a case, when the frequency of a cue signal oscillator varies widely with the aforementioned changes of time and temperature in the impedance of the CR parts, then the frequency separation of the cue signal will sometimes be disabled. Further, when the cue signal is detected by frequency separation, then a cue signal oscillator must have its frequency adjusted to a prescribed value for each tape recorder. This requirement constitutes one of the drawbacks of presenting difficulties in the reduction of the manufacturing cost of a tape recorder having a cuing function.

SUMMARY OF THE INVENTION

This invention has been accomplished in view of the above-mentioned circumstances, and is intended to provide a cue signal-recording apparatus which can record, without any particular adjustment, a cue signal whose recorded wavelength remains stable.

With a cue signal-recording apparatus provided by this invention to attain the above-mentioned object, a cue signal is produced from a certain signal whose frequency corresponds to the running speed of a recording medium and which is already actual in a tape recorder to which the cue signal-recording apparatus of the invention is to be applied. With a tape recorder using, for example, an FG servo motor, a servo control signal issued from the frequency generator of said motor has a frequency exactly proportional to the rotation speed of said motor. This means that the frequency of the servo control signal is proportional to the rotation speed of a capstan, that is, the running speed of a tape. Originally, the running speed of the tape is so adjusted as to fall within a prescribed range. Therefore, the servo control signal has a certain stable frequency. If, therefore, the servo control signal itself or a signal synchronized therewith is used as a cue signal, it is unnecessary to carry out the frequency adjustment of the cue signal alone. Further, even if the motor runs at a speed displaced or deviated from the normal level, the cue signal can be made to have a fixed recorded wavelength. When the motor runs at a speed 3% higher than the normal level, then the cue signal has its frequency increased similarly by 3%. If, in this case, a slip between the tape and capstan is overlooked, then the running speed of the tape is accelerated by 3% over the normal level. Therefore, a distance covered by the tape for one wavelength of the cue signal remains fixed, regardless of the above-mentioned deviation of the running speed of the tape from the normal level. It is seen, from this fact, that the wavelength of the cue signal recorded in the tape remains fixed without any particular adjustment. Consequently, a cue signal detected at a prescribed speed can have its frequency controlled to a prescribed level without any particular adjustment.

DETAILED DESCRIPTION OF THE PREFERRED EMBODIMENTS

Before proceeding with the description of the embodiment of the invention, it will be understood that like reference symbols are used to designate like portions throughout the drawings for simplicity of illustration. A cue signal-recording apparatus embodying this invention will be described.

Figure 1:
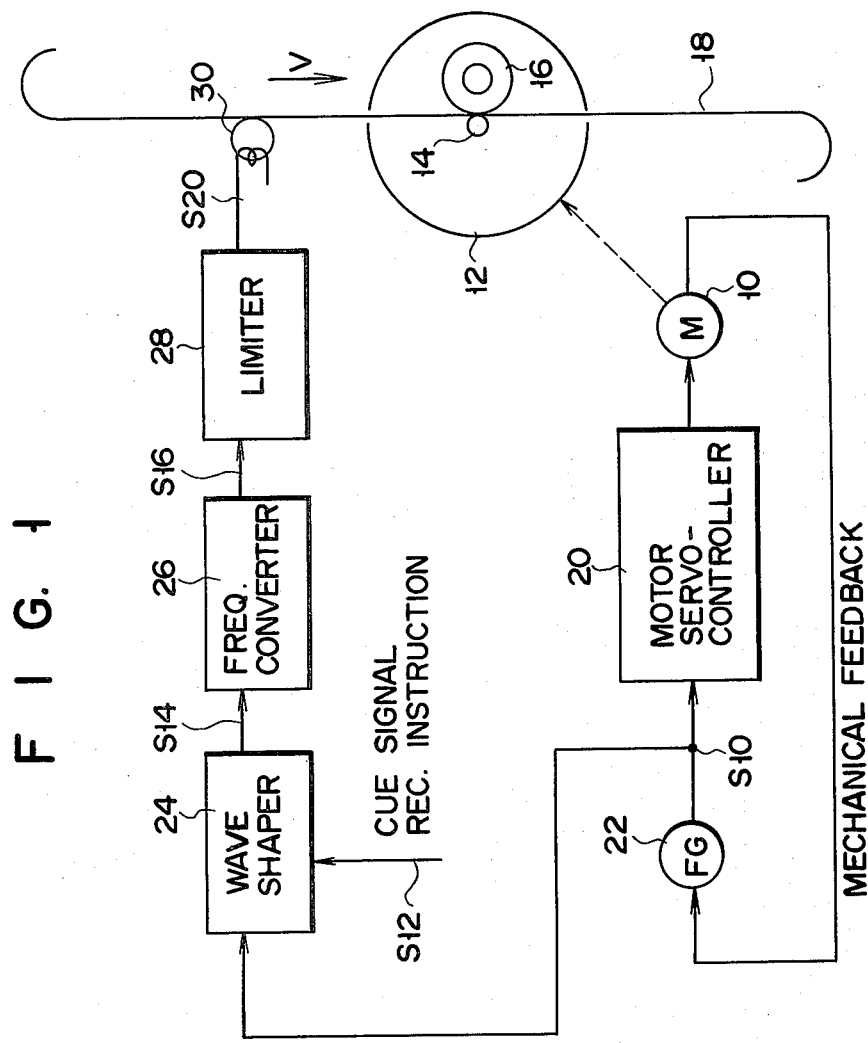
FIG. 1 is a block circuit diagram of a cue signal-recording apparatus according to one embodiment of this invention.

FIG. 1 shows the arrangement of a cue signal-recording apparatus embodying this invention. A motor 10 is coupled to a capstan flywheel 12 by means of, for example, an endless belt. The motor 10 may be concurrently used to drive tape reels (not shown). A magnetic tape 18 is made to run at a prescribed speed of, for example, 2.4 cm/s by a capstan 14 mounted on the rotary shaft of the flywheel 12 and a pinch roller 16 pressed against said capstan 14.

The motor 10 is driven by a motor servo circuit 20. This type of servo circuit 20 is already marketed in the integrated circuit form. An instance is an IC of model TCA 955 for speed regulation which is manufactured by Siemens Co., Ltd. of West Germany. The servo circuit 20 is supplied with a first signal S10 as a negative feedback signal, which is issued from a frequency generator (FG) 22 coupled to the motor 10. The motor 10, FG 22 and servo circuit 20 jointly constitutes a servo system including a mechanical feedback loop. The servo system causes the motor 10 to run at a stable speed. In other words, a first signal S10 obtained from the FG 22 has a stable frequency. The frequency of the first signal S10 has the same stability as that which is demanded of the operation of a tape-transporting system. Consequently, the running speed of the tape or the rotation speed of the motor is little subject to change with time and temperature.

The signal S10 is sent to a wave shaper 24, which is already supplied with a cue signal-recording instruction S12. The wave shaper 24 is actuated, when said instruction S12 has a logic level of, for example, "0". The wave shaper 24 carries out the wave shaping of the signal S10 and sends forth a square wave signal S14. In other words, only where the cue signal recording instruction S12 has a logic level of "0", the square wave signal S14 is sent forth from the wave shaper 24 in synchronization with the sine wave signal S10.

The square wave signal S14 is supplied to a frequency converter 26 and changed into a signal S16 by frequency conversion. The frequency converter 26 is formed of a frequency multiplier or frequency divider. It is advised to use a relaxation oscillator forcefully synchronized by the square wave signal S14 as the multiplier. Or, it is possible to distort the signal S14 by letting it pass through a nonlinear circuit to generate higher harmonics, and draw out the desired frequency component of said harmonics by applying a band-pass filter. However, the above-mentioned relaxation oscillator should be of the type which does not oscillate any signal, where the cue signal-recording instruction S12 has a logic level of "1". The frequency divider may be formed of binary counter. A programmable counter used as the frequency divider can effect any desired frequency division. When frequency conversion is not required, it is unnecessary to provide the frequency converter 26. This frequency converter 26 can be effectively utilized in the following case. Let it be assumed that the motor 10 is driven at the rotation speed of 20 rps to cause the tape 18 to run at a speed of 2.4 cm/s; and the sine wave signal S10 has a frequency of 40 Hz. When, under the above-mentioned condition, it is desired to produce a cue signal having a frequency of 20 Hz, then the frequency converter 26 is formed of a ½ frequency divider. When it is desired to obtain a cue signal having a frequency of 80 Hz, then it is advised to apply a frequency doubler as the frequency converter 26.

A signal S16 resulting from frequency conversion by the frequency converter 26 is conducted to a limiter 28, which restricts the amplitude of the signal S16 to a prescribed level and converts said signal S16 into a second signal S20. An output signal S20 from the limiter 28 is delivered to a recording head 30. The limiter 28 is used to fix the amplitude of the second signal S20, that is, the recorded level of the cue signal. Where the arrangement of FIG. 1 is applied to a cell-actuated-type tape recorder, the power supply voltage impressed on the wave shaper 24 and frequency converter 26 gradually drops as the power of the cell is consumed. This voltage drop sometimes causes the amplitude of the signals S14, S16 to vary with the cell voltage. Unless the limiter 28 is provided in such case, then the level of a cue signal recorded on the tape 18 will noticeably vary with the cell voltage. The limiter 28 may be formed of an automatic level control (ALC) circuit which acts to stabilize the amplitude of the signal S20.

When a cue signal detector (not shown) is formed of a level discrimination type, then the occurrence of changes in the level of the cue signal gives rise to considerable inconvenience. Even where the cue signal detector is of the frequency separation type, a noticeable change in the level of the cue signal is undesirable. Now let it be assumed that where a new cell is used and an adjustment is carried out to assure the proper recorded level of a cue signal. If in such case, the limiter 28 is not provided, then the recorded level of the cue signal falls with the cell voltage drop. When the cue signal level falls below a certain level, then difficulties will arise in distinguishing between the cue signal and noises when particular recorded data is searched for by the fast tape run, provably leading to the failure to detect the cue signal. The limiter 28 has a function of preventing the occurrence of errors in the detection of the cue signal due to a drop in its level.

The component 22, that is, the aforesaid FG servo motor system constitutes first means for supplying a first signal S10 having a frequency corresponding to the running speed V of the recording medium 18. The components 24 to 30 are connected to the first means and constitute second means for recording a second signal S20 synchronizing with the first signal S10 on the recording medium 18. The second signal S20 whose frequency is stabilized by a servo loop constituted by the components 20, 10 and 22 and whose amplitude is stabilized by the limiter 28 is applied as a cue signal for indicating the position (for example, the start point) of particular data recorded on the recording medium 18.

Figure 2:
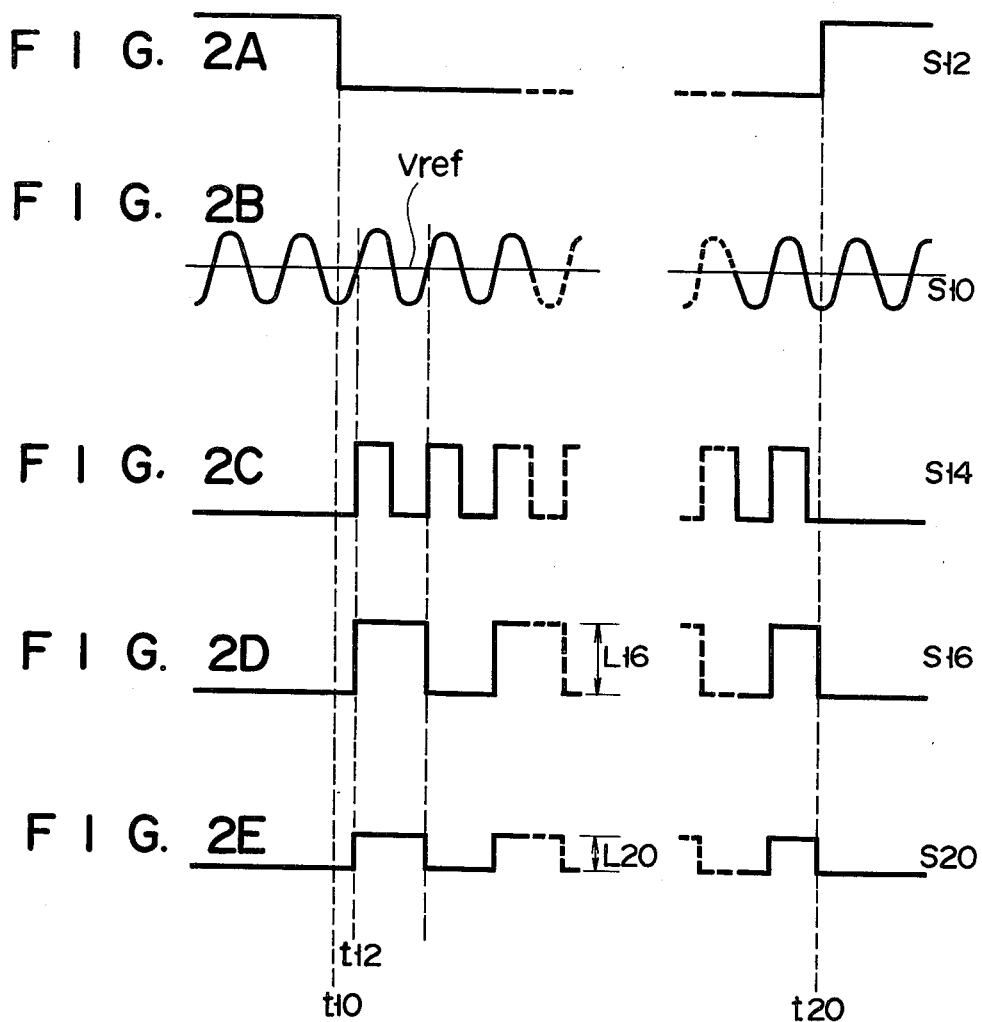
FIGS. 2A to 2E are timing charts illustrating the operation of a cue signal-recording apparatus arranged as shown in FIG. 1.

FIG. 2 indicates the waveforms of signals issued from the prescribed sections of the arrangement of FIG. 1. When the tape 18 travels at a certain speed V, then the first signal S10 assumes a sine waveform having a fixed frequency and fixed amplitude as shown in FIG. 2B. Now let it be assumed that as indicated in FIG. 2A, the cue signal recording instruction S12 has its logic level changed from "1" to "0" at a point of time t10. Then, the wave shaper 24 is put into operation. When the potential of the first signal S10 rises over a reference potential $V_{ref}$ at a point of time t12, as shown in FIG. 2B, then the signal S14 has a high level as illustrated in FIG. 2C. As a result, the signal S14 assumes a square waveform by having its level changed, each time the signal S10 crosses a level corresponding to the reference patential $V_{ref}$.

When the frequency converter 26 is a ½ frequency divider, the output signal S16 from said frequency converter 26 has a period twice that of the signal S14. The signal S16 is converted by the limiter 28 into the second signal S20 having a fixed level L20, as shown in FIG. 2E. The level L16 (FIG. 2D) of the signal S16 may be considered to vary with the power supply voltage impressed on the frequency converter 26. While, however, the level L16 remains higher than the level L20, the level L20 of the second signal S20 remains substantially unchanged, though the level L16 of the signal S16 may vary. When the cue signal-recording instruction S12 has its logic level returned to "1" at a point of time t20 (FIG. 2A), then the wave shaper 24 stops wave-shaping. Consequently, as shown in FIGS. 2C, 2D and 2E, the signals S14, S16 and S20 are extinguished after the point of time t20. Referring the FIGS. 2A to 2E, the second signal S20 whose frequency is half that of the first signal S10 and which has the fixed level L20 is recorded on the magnetic tape 18 as a cue signal during a period extending from the point of time t10 to the point of time t20.

Figure 3:
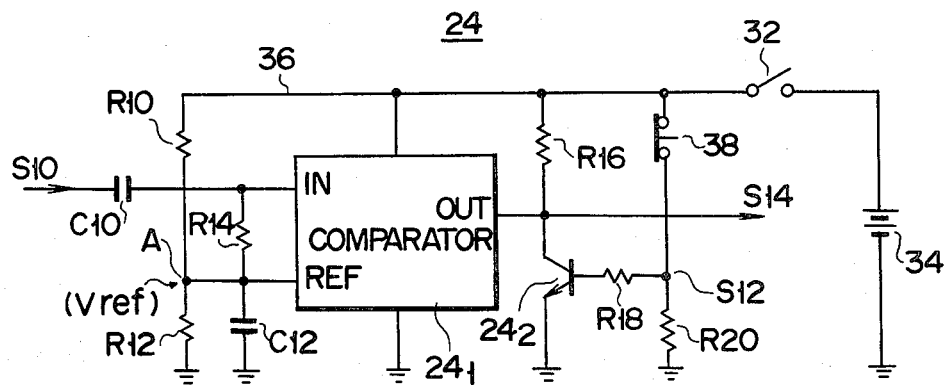
FIG. 3 shows a concrete circuit arrangement of a wave shaper of FIG. 1.

FIG. 3 indicates a concrete arrangement of the wave shaper 24 of FIG. 1.

The first signal S10 is supplied to a signal input terminal IN of a comparator $24_1$ through a coupling capacitor C10. The comparator $24_1$ receives power from a power source 34 through a switch 32. A power supply line 36 of the comparator $24_1$ is grounded through resistors R10 and R12. The reference potential $V_{ref}$ is produced at a junction A of the resistors R10 and R12. The junction A is grounded through a bypass capacitor C12, and connected to a reference input terminal REF of the comparator $24_1$. The input terminal IN of the comparator $24_1$ is biased by the reference potential $V_{ref}$ through a resistor R14. The above-mentioned comparator $24_1$ may be formed of, for example, an operational amplifier or Schmitt trigger circuit. At present, however, such comparator is marketed at low cost in the IC form. An instance is a model M51202L manufactured by Mitsubishi Electric Co. of Japan. This integrated circuit model M51202L has an output terminal OUT of an open collector type.

The output terminal OUT of the comparator $24_1$ is connected to the power supply line 36 through a load resistor R16. Said output terminal OUT is grounded through the collector-emitter path of an NPN transistor $24_2$. The base of the transistor $24_2$ is connected to the power supply line 36 through a resistor R18 and cue signal recording switch 38. A junction of the resistor R18 and cue signal recording switch 38 is grounded through a resistor R20.

When the power supply switch 32 is rendered conducting, then the comparator $24_1$ is actuated. Where, in this case, the switch 38 is rendered conducting, then a cue signal recording instruction S12 supplied to the base of the transistor $24_2$ has a logic level of "1". Consequently, the transistor $24_2$ is rendered conducting, and the output terminal OUT of the comparator $24_1$ is grounded through the collector-emitter path of the transistor $24_2$. Even when the comparator $24_1$ is supplied with the first signal S10, the output signal S14 still retains at logic level "0". When the switch 38 is rendered nonconducting, the cue signal recording instruction S12 has a logic level "0", and the transistor $24_2$ is rendered nonconducting, after the point of time t10 (FIG. 2A). As a result, the square wave signal S14 (FIG. 2C) corresponding to the signal S10 is produced at the output terminal OUT of the comparator $24_1$. The nonconducting state of the switch 38 corresponds to the logic level "0" at which the cue signal-recording instruction S12 retains during a period extending from a point of time t10 to the point of time t20. (FIG. 2A).

Figure 4:
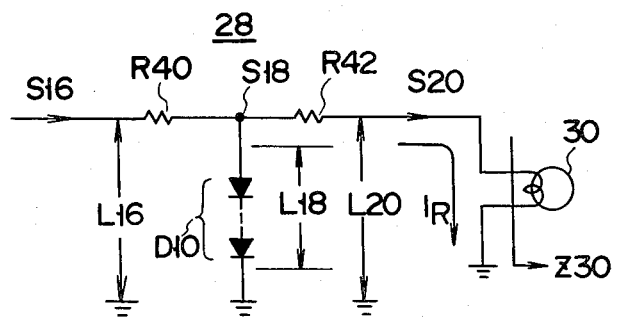
FIG. 4 indicates a concrete circuit arrangement of a limiter of FIG. 1.

FIG. 4 shows a concrete arrangement of the limiter 28 of FIG. 1. The signal S16 is supplied to an anode of a diode block D10 through a resistor R40. A cathode of the diode block D10 is grounded. The anode of the diode block D10 is grounded through a resistor R42 and a recording head 30. The resistor R40 and diode block D10 jointly constitute a limiter for restricting a peak level L18 of the signal S18 produced at the anode of the diode block D10 to a prescribed level. Where the diode block D10 is formed of, for example, three silicon diodes, then the peak level L18 of the signal S18 corresponds to about 1.8 volts as measured at room temperature. In this case, the peak level L16 of the signal S16 should correspond to a higher voltage than 1.8 volts. While remaining lower than the peak level L16, i.e. L16>L18, the level L18 is little changed, even when the peak level L16 varies. When a high impedance prevails on the side of the signal S16, then the resistor R40 can be emitted.

The magnitude of a cue signal-recording current IR supplied to the recording head 30 is defined in accordance with the magnitude of the resistor R42 and a composed impedance Z30 of recording head 30. Assuming R42>>Z30, there results IR≈L18/R42. Further assuming L18=1.8 V, and R42=3 KΩ, then current IR of about 0.6 mA is supplied to the recording head 30 as a cue signal. The magnitude of the current IR varies chiefly with the number of diodes constituting the block D10, the resistance of the resistor R42 and the magnitude of the impedance of the recording head 30. Assuming that the impedance Z30 of the recording head is 300 Ω, then the peak level L20 corresponds to a fixed voltage of about 180 mV. The current IR has an equal frequency to that of the signal S16. When the frequency converter 26 of FIG. 1 is, for example, a doubler and the first signal S10 has a frequency of 40 Hz, then the current IR is supplied to the recording head 30 as a cue signal whose peak amplitude is about 0.6 mA and whose frequency is 80 Hz. When, in this case, the tape runs exactly at a speed V of 24 mm/s, then the cue signal recorded on the tape 18 will have a wavelength λ of 24/80=0.300 mm.

Now let it be assumed that the tape 18 runs at a speed of 24.48 mm/s (+2% higher than prescribed) due to the irregular adjustment of the servo circuit 20. Since, at this time, the FG 22 is rotated at a speed 2% higher than prescribed, the first signal S10 has a frequency of 40.8 Hz. As a result, the current IR or second signal S20 has a frequency of 81.6 Hz. Thus, the cue signal recorded on the tape 18 has a wavelength λ of 24.48/81.6=0.300 mm. The above-mentioned event is not different from the case where the tape 18 runs exactly at a speed of 24 mm/s.

When the frequency converter 26 carries out ½ frequency division, then the cue signal has a fixed wavelength λ regardless of changes in the running speed of the tape 18 as $$\lambda = 24/20 = 1.20 \text{ mm in case of } V = 24 \text{ mm/s}$$

$$\lambda = 24.48/20.4 = 1.20 \text{ mm in case of } V = 24.48 \text{ mm/s}$$

The above-mentioned fact means that even where the tape 18 is set at the fast running mode with the capstan drive, it is possible to record a cue signal having a fixed wavelength on the tape 18.

As described above, a cue signal-recording apparatus embodying this invention has the advantages that it is possible to record on a magnetic tape a cue signal whose wavelength and level are stabilized without the necessity of carrying out any particular adjustment; no particular cue signal-oscillating circuit has to be provided; it is unnecessary to adjust the frequency of a cue signal; and consequently the cost of manufacturing a cue signal-recording apparatus is effectively reduced.

Detection of a cue signal recorded on a tape by the aforementiond cue signal recording apparatus of this invention can be effected by the prior art technique, description thereof being omitted. When, however, it is desired to know the details of said cue signal-detecting apparatus, it is suggested here that reference be made to the under mentioned patent applications. These patent applications were assigned to the same assignee as that of the present patent application.

(1) Japanese patent application No. 54-107,516 entitled "A cue signal-producing system" corresponding to U.S. Ser. No. 171,970 (filed July 24, 1980), now U.S. Pat. No. 4,389,685;
(2) Japanese patent application No. 54-123,690 entitled "A recorded data position-detecting system" corresponding to U.S. Ser. No. 187,764 (filed Sept. 16, 1980), now U.S. Pat. No. 4,377,826. Further, various cue signal-detecting apparatuses have already been set forth in the following patent publications, though filed by different applicants from that of the present invention.

(1) Japanese Patent Publication 51-36,608 "A system for recording and reproducing a control signal"
(2) Japanese Patent Publication 53-28,082 "A control signal-detecting apparatus for a magnetic recording and reproducing machine".

Figure 5:
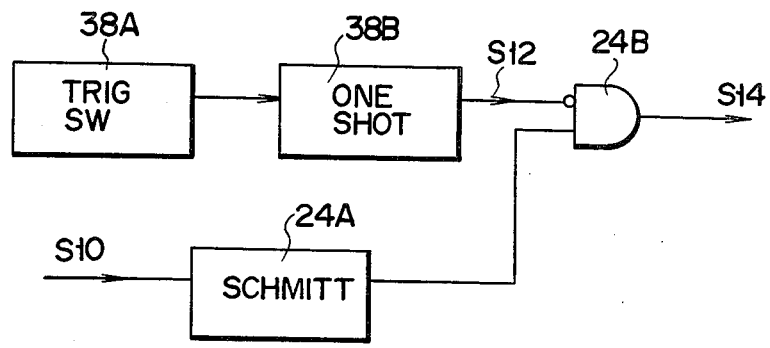
FIG. 5 is a modification of the wave shaper of FIG. 3.

It will be noted that the embodiments disclosed in detail in the accompanying drawings do not restrict this invention in any way. Obviously, the invention can be applied in various changes and modifications without departing from the scope of the invention as claimed. For instance, in FIG. 3, the switch 38 provided is continuously depressed while a cue signal is recorded. However, said switch 38 may be replaced by a trigger switch 38A and one-shot multivibrator 38B. Namely, when the trigger switch 38A carries out triggering as shown in FIG. 5, then the multivibrator 38B automatically sends forth a cue signal-recording instruction S12 having a logic level of "0" (FIG. 2A) for a prescribed period. While said cue signal-recording instruction S12 is supplied, an output signal from a Schmitt trigger 24A is conducted through an AND gate 24B to be changed into the signal S14. When need arises, the first signal S10 itself may be applied as the second signal S20, that is, a cue signal, without wave shaping. The cue signal may be recorded on a dictation track or an exclusive track for a cue signal.

Figure 6:
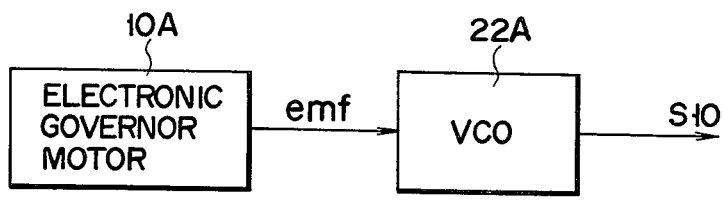
FIG. 6 sets forth a modification of the FG 22 of FIG. 1.
Figure 7A:
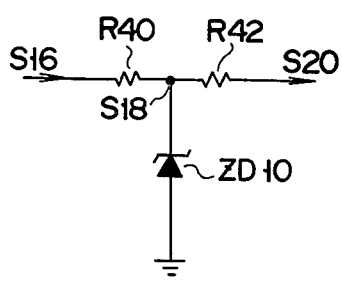
FIGS. 7A and 7B are modifications of the limiter of FIG. 4.
Figure 7B:
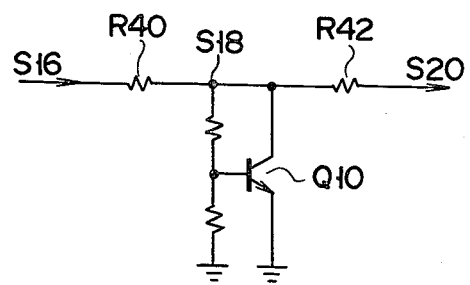

Further, this invention is also applicable, when the motor 10 is an electronic governor type D.C. motor 10A and the FG 22 is not provided. In this case it is advised to apply as first means a voltage controlled oscillator (VCO) 22A which carries out oscillation at a frequency proportional to the counter electromotive force emf of the motor 10A (FIG. 6). Further with this invention, the FG 22 may be replaced by a brushless servo motor provided with a Hall element for detection of servo. The limiter of FIG. 4 may be formed of a Zener diode ZD10 or transistor Q10 (FIGS. 7A and 7B). A number of diodes constituting the block D10 (FIG. 4) may be freely chosen.

What is claimed is:

1. A cue signal-recording apparatus which comprises:
   a motor for driving a recording medium at a given running speed relative to a recording head;
   first means coupled to the motor for providing a first signal having a frequency which corresponds to the running speed of the recording medium; and
   second means coupled to the first means and to said recording head for producing a cue signal from said first signal so that said cue signal is time-synchronized with said first signal, and for recording said cue signal on the recording medium such that the wavelength of said cue signal recorded on said recording medium is substantially constant regardless of the running speed of the recording medium during recording of said cue signal, said cue signal indicating the position of particular data recorded on the recording medium.

2. The cue signal-recording apparatus according to claim 1, wherein the second means includes a frequency converter for converting by a given ratio a frequency of the first signal to another frequency, and means for varying the frequency of the cue signal as a function of the ratio in which the frequency converter carries out the frequency conversion.

3. The cue signal-recording apparatus according to claim 2, wherein the third means includes a frequency divider.

4. The cue signal-recording apparatus according to claim 2, wherein the third means includes a frequency multiplier.

5. The cue signal-recording apparatus according to any one of claims 1 to 4, wherein the second means includes fourth means for setting the amplitude of the cue signal at a prescribed level.

6. The cue signal-recording apparatus according to claim 5, wherein the fourth means includes limiter means for restricting the amplitude of the cue signal to a prescribed level.

7. The cue signal-recording apparatus according to any one of claims 1 to 4, wherein the second means includes fifth means for shaping the first signal into a square wave signal.

8. The cue signal-recording apparatus according to any one of claims 1 to 4, wherein the second means includes means for generating a cue signal-recording instruction before recording of the cue signal; and gate means responsive to the cue signal-recording instruction for providing a wave-shaped signal corresponding to the first signal only upon receipt of the cue signal-recording instruction.

9. The cue signal-recording apparatus according to any one of claims 1 to 4, wherein the first means includes a generator which is connected to the motor and provides the first signal.

10. The cue signal-recording apparatus according to any one of claims 1 to 4, wherein the first means includes a voltage controlled oscillator which is connected to the motor and oscillates an output signal whose magnitude corresponds to that of the counter electromotive force of the motor, said oscillated output signal corresponding to the first signal.

11. A cue signal-recording apparatus which comprises:
   a motor for driving a recording medium relative to a recording head;
   generator means connected to the motor for generating a detection signal having a frequency which corresponds to the rotation speed of the motor;
   control means connected to the generator means and to the motor and being responsive to the frequency of the detection signal for controlling the rotation speed of the motor;
   wave shaping means connected to the generator means for issuing upon receipt of a cue signal-recording instruction a pulse signal whose frequency corresponds to that of the detection signal;
   frequency-converting means connected to the wave shaping means for converting the frequency of the pulse signal and for producing a converted signal whose frequency corresponds to the rotation speed of the motor;
   limiter means connected to the frequency-converting means for supplying a cue signal which has a prescribed amplitude and the same frequency as that of the converted signal; and
   recording means connected to the limiter and to the recording head for recording the cue signal on said recording medium driven by the motor such that the wavelength of the cue signal recorded on said recording medium is substantially constant regardless of the running speed of the recording medium during recording of said cue signal, said cue signal indicating the position or location of particular data recorded on said recording medium.

* * * * *